H. A. BARNARD.
Smut-Mills.
No. 144,050. Patented Oct. 28, 1873.
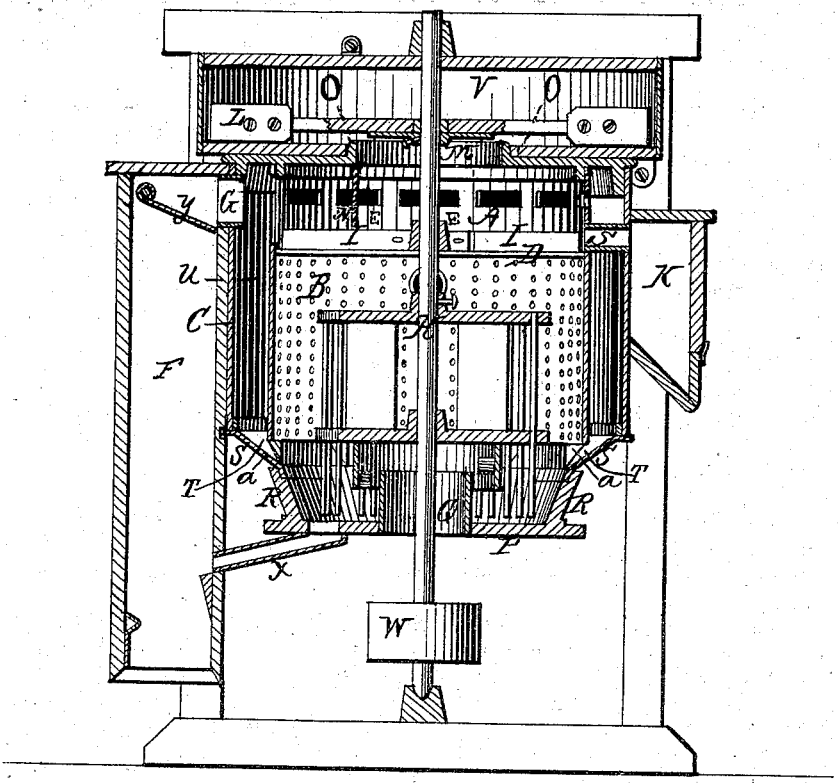
Witnesses
John A. Ellis
Edward O. Ellis
Inventor
Heman A. Barnard
Per.
T. H. Alexander & Co.
Attys.

UNITED STATES PATENT OFFICE.

HEMAN A. BARNARD, OF MOLINE, ILLINOIS, ASSIGNOR TO THE BARNARD AND LEAS MANUFACTURING COMPANY, OF SAME PLACE.

IMPROVEMENT IN SMUT-MILLS.

Specification forming part of Letters Patent No. 144,050, dated October 28, 1873; application filed June 25, 1873.

*To all whom it may concern:*

Be it known that I, H. A. BARNARD, of Moline, in the county of Rock Island and State of Illinois, have invented certain new and useful Improvements in Combined Smutter and Separator; and I do hereby declare that the following is a full, clear, and exact description thereof, reference being had to the accompanying drawings and to the letters of reference marked thereon, which form a part of this specification.

This invention relates to a combined smutter and separator; and consists in the arrangement of the trunk, valve, and chamber with the scraper and space, and in the form of the shield, and in the combination of parts, as hereinafter more fully described.

In order to enable others skilled in the art to which my invention appertains to make and use the same, I will now proceed to describe its construction and operation, referring to the annexed drawing, which represents a longitudinal vertical section of my invention.

B represents the scouring-case, and C the outer case, which are extended upward as high as may be desired from the top plate D of the scouring-case to form a chamber, A. U represents the space between the two cases B and C, and extends downward their entire length, forming a passage for the air and dust to pass outward to the chamber A. The case B is provided with openings E E near its top, extending entirely around it, connecting the air passage or space U with the said chamber A, for the air and dust to enter said chamber. F represents the separating-trunk, which is connected by an opening, G, with the chamber A, allowing the air and screenings to enter the chamber. Y represents a hinged valve to regulate the current of air ascending the trunk F. H is the upright shaft, which extends from the top to the bottom of the machine, and has a scraper, I, fastened to it, and revolves with it. The scraper I is placed in the chamber A immediately above the top plate D of the scouring-case, and which forms the bottom or floor of the chamber A. J is an opening through which the screenings are discharged from the chamber A into the outer screen-box, R, by the revolutions of the scraper I. L represents the fan, which is fastened to the shaft H, revolves with it, and is located just above the chamber A. M is a round opening in the top plate O of the chamber A and bottom of the fan-drum V, for the passage of the air from said chamber to the fan. The fan-drum V rests on said top plate O. N is a semicircular partition or shield fitted into the opening M, and extending downward nearly to the scraper I, and is used as a shield to prevent the screenings entering the chamber A at the opening G from being drawn up into the fan through said opening M. P is the bottom of the scouring-case B, with a hole or opening, Q, in the center for the admission of air. R is the first ring in the scouring-case B, and has a flaring ring, S, made of iron fitted to it, and extending out far enough to support the outer case C. This ring S has small projections *a* on the inner side near the bottom of it, on which rests the entire scouring-case B above the ring R. The sides of the ring S are steep enough to act as an incline to slide the screenings through the opening T in the scouring-case, said opening extending entirely around, except where the projections *b* occur, and allowing the air and dust to pass up through it into the space U, and also allows the screenings driven through the scouring-case B into the space U to fall back again into the case B among the wheat. W is the pulley by which motion is imparted to the shaft H by the use of a belt. X is a spout through which the wheat passes from the screening-case B to the separating-trunk F.

The machine is operated as follows: Motion being imparted to the shaft H, the fan L causes a current of air to ascend the separating-trunk F and pass into the chamber A at the opening G. Another current enters the machine at the opening Q, and, dividing, part passes through the opening T, and part through the openings in the ventilating scouring-case B, and, uniting again in the passage U, pass up it through the openings E E into the chamber A, uniting with the current coming from trunk F, and both, passing up through the opening M into the fan-drum V, are forced, by the fan L, out of the machine. The wheat, which enters through a spout in the side of the machine, passes down through the scouring-case B, where it is thoroughly scoured, the dust and scourings being expelled through the openings in the case B, and drawn by the ascending current of air up through the chamber A into the fan. The fine screenings drop down onto the ring S, slide through the opening T into the inside of the case B, and pass with the wheat through the spout X into the separating-trunk F, when the ascending current of air draws the screenings up into the chamber A, striking the shield N, and, dropping onto the floor D, are expelled by the revolving scraper I out into the screen-box K, while all the dust is drawn up into the fan-drum V and blown out of doors, thus wasting nothing.

Having thus fully described my invention, what I claim as new, and desire to secure by Letters Patent, is—

1. The trunk F, valve Y, opening G, and chamber A, arranged, in relation to the space U and scraper I, substantially as and for the purpose set forth.

2. The shield N, of semicircular form, fitted in the opening M, and extending downward nearly to the scraper I in the chamber A, substantially as and for the purpose specified.

3. The combination, with the chamber or screen-box A and its interior revolving scraper I, of the separating-trunk F, discharge-box K, and fan L, substantially as and for the purpose herein set forth.

In testimony that I claim the foregoing as my own, I affix my signature in presence of two witnesses.

H. A. BARNARD.

Witnesses:
D. C. DIMOCK, Jr.,
CHS. R. AINSWORTH.